(12) United States Patent
Cuylen

(10) Patent No.: US 7,519,361 B2
(45) Date of Patent: *Apr. 14, 2009

(54) METHOD FOR CHECKING THE QUALITY OF DATA TRANSMISSION BETWEEN A READ/WRITE DEVICE AND AT LEAST ONE MOBILE DATA MEMORY, AND READ/WRITE DEVICE AND MOBILE DATA MEMORY FOR USING THE METHOD

(75) Inventor: Michael Cuylen, Zirndorf (DE)

(73) Assignee: Siemens AG, Munich (DE)

( * ) Notice: Subject to any disclaimer, the term of this patent is extended or adjusted under 35 U.S.C. 154(b) by 477 days.

This patent is subject to a terminal disclaimer.

(21) Appl. No.: 10/532,242

(22) PCT Filed: Oct. 9, 2003

(86) PCT No.: PCT/DE03/03344

§ 371 (c)(1),
(2), (4) Date: Nov. 16, 2005

(87) PCT Pub. No.: WO2004/038591

PCT Pub. Date: May 6, 2004

(65) Prior Publication Data

US 2006/0123149 A1 Jun. 8, 2006

(30) Foreign Application Priority Data

Oct. 22, 2002 (DE) .................................. 102 49 203

(51) Int. Cl.
*H04Q 7/00* (2006.01)

(52) U.S. Cl. .................. 455/423; 455/69; 455/67.11; 455/425; 455/424; 370/328

(58) Field of Classification Search ........ 455/41.1–41.3, 455/410–411, 500, 507, 423–425, 67.11, 455/67.16, 85–86, 550.1, 70, 95, 115.1, 126, 455/343.1; 340/10.1–10.5, 10.51, 10.52, 340/10.41, 10.42, 5.8; 235/462.25, 472.02, 235/380, 375; 370/347, 346, 458, 449; 714/5, 714/42, 718, 746

See application file for complete search history.

(56) References Cited

U.S. PATENT DOCUMENTS 5,640,164 A 6/1997 Gunnarsson (Continued)

FOREIGN PATENT DOCUMENTS

DE 34 41 644 A 5/1986

(Continued)

*Primary Examiner*—George Eng
*Assistant Examiner*—Kamran Afshar
(74) *Attorney, Agent, or Firm*—Sughrue Mion, PLLC

(57) ABSTRACT

A method and associated apparatus for checking the data transmission between at least one read/write device (SLG) and at least one mobile data memory (MDS), in particular in an identification system having at least one mobile data memory (MDS) which is fitted to objects, for recording object-related status and/or process data, for example in a system for dispatching, transporting and/or manufacturing the individual objects. The read/write device (SLG) and/or the mobile data store (MDS) have at least one register region for input of data information concerning the quality of the data transmission between the read/write device (SLG) and the mobile data store (MDS). This register region is read by at least one external computer application station (4), for checking the quality of the data transmission between the read/write device (SLG) and the mobile data store (MDS).

10 Claims, 2 Drawing Sheets

U.S. PATENT DOCUMENTS

| | | | | |
|---|---|---|---|---|
| 6,164,530 | A * | 12/2000 | Cheesebrow et al. | 235/380 |
| 6,298,233 | B1 | 10/2001 | Souissi et al. | |
| 6,918,108 | B2 * | 7/2005 | Rajaram | 717/126 |
| 7,205,931 | B2 * | 4/2007 | Gila et al. | 342/127 |
| 7,289,458 | B2 * | 10/2007 | Gila et al. | 370/278 |
| 2003/0002451 | A1 | 1/2003 | Konrad et al. | |
| 2005/0111473 | A1 * | 5/2005 | Cuylen et al. | 370/418 |

FOREIGN PATENT DOCUMENTS

| | | |
|---|---|---|
| DE | 198 44 631 A1 | 4/2000 |
| DE | 101 08 351 A1 | 8/2002 |
| EP | 1 107 163 A1 | 6/2001 |
| WO | WO 02/082363 A1 | 10/2002 |

* cited by examiner

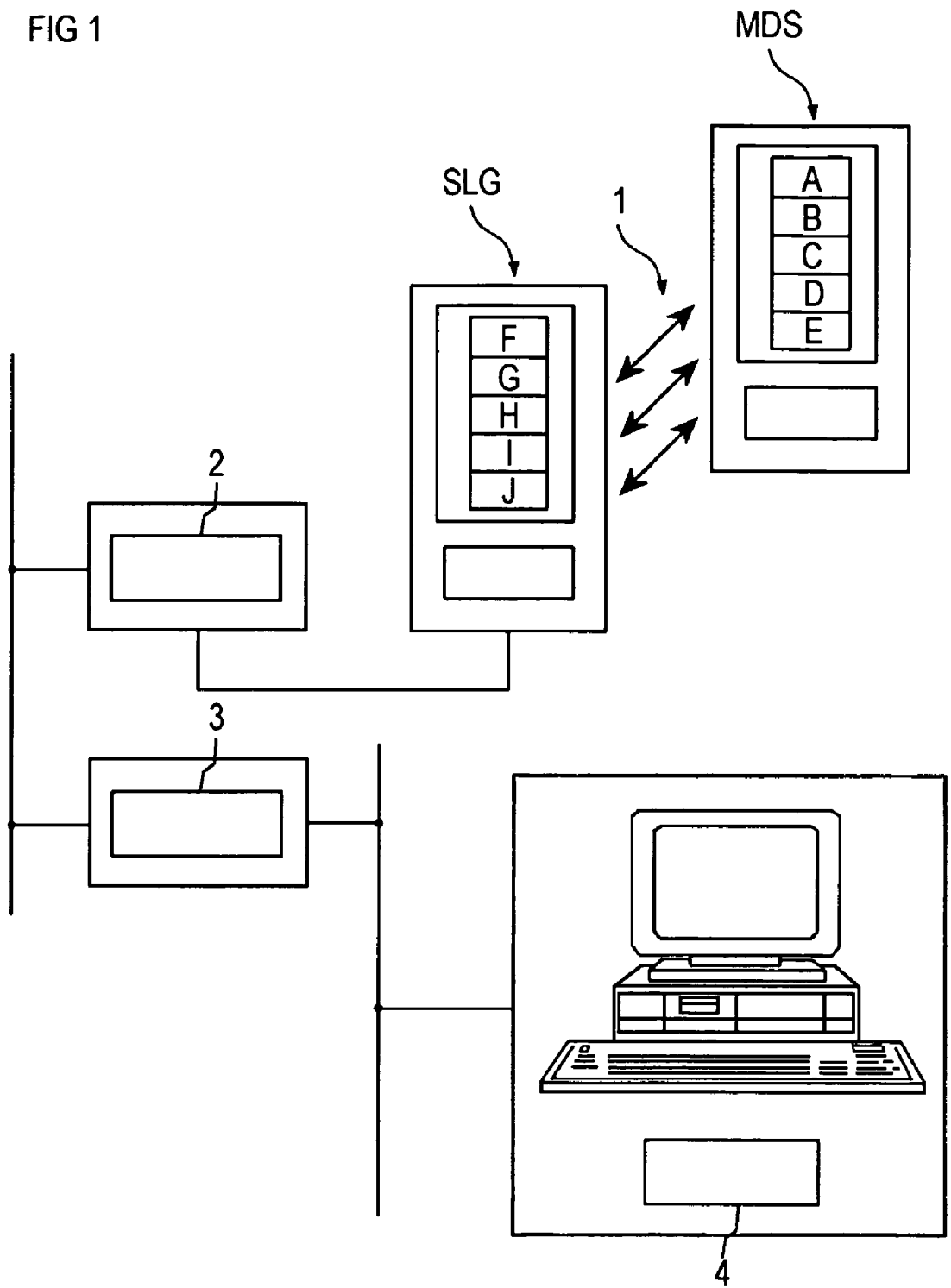

FIG 2

| No. | Register | Information | Unit |
|---|---|---|---|
| 1 | F | The length of time for which there was no MDS in the field | s |
| 2 | G | Duration of communication with the MDS | s |
| 3 | H | Number of collisions during multiple day operation (plurality of data storage media) | n |
| 4 | I | Number of message repetitions to the MDS | n |
| 5 | J | Number of disturbances while the MDS is receiving the data | n |

FIG 3

| No. | Register | Information | Unit |
|---|---|---|---|
| 1 | A | Period of presence, i.e. the length of time for which the MDS has already been in the field | s |
| 2 | B | Magnitude of the supply voltage, indirectly field strength and range | V |
| 3 | C | Temperature of the MDS chip | °C |
| 4 | D | Number of message repetitions to the read/write device | n |
| 5 | E | Number of disturbances while the read/write device is receiving the data | n |

METHOD FOR CHECKING THE QUALITY OF DATA TRANSMISSION BETWEEN A READ/WRITE DEVICE AND AT LEAST ONE MOBILE DATA MEMORY, AND READ/WRITE DEVICE AND MOBILE DATA MEMORY FOR USING THE METHOD

BACKGROUND OF THE INVENTION (1) Field of the Invention

Method for checking the quality of data transmission between a read/write device (SLG) and at least one mobile data memory (MDS), and read/write device (SLG) and mobile data memory (MDS) for using the method The invention relates to a method for checking data transmission between at least one read/write device (SLG) and at least one mobile data memory (MDS), in particular in an identification system having at least one mobile data memory (MDS) which is fitted to objects and is intended to detect object-related state and/or process data, for example in a system for dispatching, transporting and/or manufacturing the individual objects. The invention also relates to a read/write device (SLG) and to a mobile data memory (MDS) for using the method.

(2) Description of the Related Art

High-speed data transmissions between read/write devices (SLG) and mobile data memories (MDS) are known as the prior art in industrial non-contacting identification technology. The respective PTT radio regulations must be complied with as regards the frequency, field strength, modulation bandwidth, interference emissions, interference influences etc. of the air interfaces which occur in this case. When there are additional electromagnetic sources, data transmission between the read/write devices (SLG) and the mobile data memories (MDS) may be subject to interference in the air interface. The data transmission reliability is also influenced and possibly impaired by location-related conditions and environment data, for example the distance between the read/write device (SLG) and the mobile data memory (MDS), the travel speed of the mobile data memory (MDS), the ambient temperature etc.

BRIEF SUMMARY OF THE INVENTION

The invention is based on the object of providing a method for checking the quality of data transmission between at least one read/write device (SLG) and at least one mobile data memory (MDS). A further aim is to provide a read/write device (SLG) and a mobile data memory (MDS) for using the method.

In the inventive method for checking data transmission between at least one read/write device (SLG) and at least one mobile data memory (MDS), at least one register area for entering data information relating to the quality of data transmission between the read/write device (SLG) and the mobile data memory (MDS) is provided in the read/write device (SLG) and/or in the mobile data memory (MDS). This register area is read and/or evaluated by at least one external computer user station for the purpose of checking the quality of data transmission between the read/write device (SLG) and the mobile data memory (MDS). This computer user station can be used to remotely diagnose data transmission between the read/write device (SLG) and mobile data memories (MDS) in a specific manner, and it is possible to identify and eliminate data transmission problems which occur, in particular, during commissioning of a data transmission system such as this but also when using the system in the field.

The inventive method can be used to detect the quality of the air interfaces when transmitting data between the read/write device (SLG) and the mobile data memory (MDS) and to assess and evaluate said quality in the external computer user station. All communication faults or impairments such as to communication can also be detected and eliminated.

According to one advantageous method variant, the external computer user station can be connected to at least one read/write device (SLG) for the purpose of transmitting data. This makes it possible to read the respective register areas in the read/write device (SLG) which relate to the quality of data transmission.

The read/write device (SLG) in turn communicates with the mobile data memory (MDS) and can read the appropriate register areas which relate to the quality of data transmission and can store them in its own register areas in order to be read by the external computer user station.

In accordance with another advantageous method variant, the external computer user station is connected to the read/write device (SLG) via a connection module. In a connection module such as this, data can be transmitted between the read/write device (SLG) and the external computer user station in accordance with a protocol. A connection module such as this makes it possible to transmit data, which has been transmitted, for example, from the read/write device (SLG) to the external computer user station, only after blocks have been formed, packets have been formed and protocol conformity has been checked. A connection module such as this makes it possible to transmit data between the read/write device (SLG) and the external computer user station in a more reliable and more rapid manner.

In accordance with another advantageous method variant, the external computer user station can be connected to the read/write device (SLG) via a controller, for example for controlling a dispatch, transport and/or manufacturing system. In this case, the controller is used to control the processes in the respective industrial system being operated and instigates and monitors planned operation of systems such as these. When the external computer user station is connected to the read/write device (SLG) via a controller such as this, it is also possible, in addition to the items of data which are to be read from the read/write device (SLG), to read items of control data and to associate them with one another and jointly evaluate them in the external computer user station. This makes it possible to also take into account, in the external computer user station, the respective process states of the controlled industrial system when evaluating the data (relating to the quality of data transmission between the read/write device (SLG) and mobile data memories (MDS)) received from the read/write device (SLG).

The inventive read/write device (SLG) has at least one register area for entering data information relating to the quality of data transmission to the mobile data memories (MDS). In addition to storing the object-related state and/or process data detected between the read/write device (SLG) and the mobile data memory (MDS), this at least one further register area also makes it possible to store data relating to the quality of data transmission, and to store the latter in order to be read by the external computer user station. The inventive read/write device (SLG) is thus also suited to remote diagnosis using an external computer user station.

In one advantageous embodiment of the read/write device (SLG), the register area for entering the data information relating to the quality of data transmission is associated with a further register area in at least one mobile data memory (MDS), this further register area likewise being provided for entering data information relating to the quality of data transmission.

Associating register areas such as these between the read/write device (SLG) and the mobile data memory (MDS) makes it possible for data and protocol formats to be appropriately matched to one another and for items of information which refer to one another to also be stored in corresponding register areas. This makes it easier to read the data information relating to the quality of data transmission from the respective register areas.

The inventive mobile data memory (MDS) advantageously likewise has at least one register area for entering data information relating to the quality of data transmission. This likewise facilitates communication with the read/write device (SLG), as described above.

BRIEF DESCRIPTION OF THR DRAWINGS

The invention is explained in more detail using exemplary embodiments in the figures of the drawing, in which:

FIG. 1 shows a schematic illustration of one possible connection of the mobile data memory (MDS) and the read/write device (SLG) to an external computer user station, FIG. 2 shows a specific illustration of register areas in a read/write device (SLG), and FIG. 3 shows a specific illustration of register areas in a mobile data memory (MDS).

DETAILED DESCRIPTION OF THE EXEMPLARY EMBODIMENTS OF THE INVENTION

FIG. 1 shows a read/write device (SLG) and a mobile data memory (MDS) in a dispatch, transport and/or manufacturing system (which is known per se but is not shown in any more detail) for detecting object-related state and/or process data of the respective system. In this case, the read/write device (SLG) is stationary, and data is transmitted between the read/write device (SLG) and the respective mobile data memories (MDS) via an air interface 1. A read/write device (SLG) usually communicates with a plurality of mobile data memories (MDS) (not shown in any more detail).

The read/write device (SLG) is connected to an external computer user station (for example a personal computer) via a connection module 2 and a controller 3, to be precise via a network (for example TCP/IP, WLAN etc.) that is known per se. The data transmitted in the network may be transmitted in accordance with various network protocols (for example ProfiBus, CAN, EtherNet etc.) which are known per se.

According to the invention, the read/write device (SLG) has additional register areas F, G, H, I and J for entering data information relating to the quality of data transmission with the mobile data memory (MDS). The read/write device (SLG) also has register areas (known per se) for recording and storing the object-related state and/or process data (not shown in any more detail) which has been transmitted. Additional register areas A, B, C, D and E which are likewise used to enter data information relating to the quality of data transmission with the read/write device (SLG) are likewise provided in the mobile data memory (MDS).

The computer user station 4 can now use the controller 3 and the connection module 2 to read the register areas F-J in the read/write device (SLG) and to detect the data information which relates to the quality of data transmission and is stored in said read/write device and also to eliminate data transmission errors in the event of disturbances occurring.

FIGS. 2 and 3 show, by way of example, data information relating to the quality of data transmission. The data information relating to the period of time for which there was no mobile data memory (MDS) in the existing data transmission field can be stored in the register area F in the read/write device (SLG). The duration of communication with the mobile data memory (MDS) can be stored in the register area G. The register area H can record the number of collisions during multiple day operation with a plurality of mobile data memories (MDS).

The number of message repetitions to the mobile data memory (MDS) can be recorded in the register I, and the number of disturbances while the mobile data memory (MDS) is receiving data can be recorded in the register area J.

The register areas F-J in the read/write device (SLG) thus comprise data information relating to the quality of data transmission between the read/write device (SLG) and the mobile data memory (MDS), which data information can be read and evaluated by the external computer user station 4. This means that, when reading the register area A, for example, it is possible to establish, from the determination of a large number of collisions during operation with a plurality of mobile data memories (MDS), that the read/write device (SLG) may communicate only with a relatively small number of mobile data memories (MDS) in order to eliminate the communication disturbance.

As shown in FIG. 3, in addition to register areas (which are known per se but are not shown in any more detail) for recording and storing the object-related state and/or process data that has been transmitted, the mobile data memory (MDS) has, according to the invention, register areas A-E, with the period for which the mobile data memory (MDS) is present in the data field, for example, being recorded in the register area A. The magnitude of the supply voltage of the mobile data memory (MDS) may be ascertained directly, and the field strength of the field of the mobile data memory (MDS) and the range of the field of the mobile data memory (MDS) may thus be ascertained indirectly, in the register area B.

The register area C may relate to the temperature of the mobile data memory chip (MDS), the register area D may relate to the number of message repetitions to the read/write device (SLG), and the register area E may relate to the number of disturbances when the read/write device (SLG) is receiving the data.

The register areas A-E may be read by the external computer user station 4 using the read/write device (SLG). In this case, the register areas G and J in the read/write device (SLG) and in the mobile data memory (MDS) are associated with one another, by way of example, and respectively relate to the number of disturbances when the read/write device (SLG) and the mobile data memory (MDS), respectively, are receiving the data. It is possible to facilitate the analysis and elimination of disturbances in the external computer user station 4 by reading and evaluating associated register areas such as these.

The invention claimed is:

1. A method for checking data transmission between at least one read/write device (SLG) and at least one mobile data memory (MDS), wherein at least one of the read/write device (SLG) and the mobile data memory (MDS) has at least one register area for entering data information relating to the quality of data transmission between the read/write device (SLG) and the mobile data memory (MDS), and wherein this register area is read by at least one external computer user station (4) for checking the quality of data transmission between the read/write device (SLG) and the mobile data memory (MDS).

2. The method as claimed in claim 1, wherein the external computer user station (4) is connected to the read/write device (SLG) for transmitting data.

3. The method as claimed in claim 2, wherein the external computer user station (4) is connected to the read/write device (SLG) via a connection module (2).

4. The method as claimed in claim 3, wherein the external computer user station (4) is connected to the read/write device (SLG) via a controller (3).

5. A read/write device (SLG) configured for using a method for checking the quality of data transmission between the read/write device (SLG) and at least one mobile data memory (MDS), as claimed in claim 1, comprising at least one register area for entering data information relating to the quality of data transmission.

6. The read/write device (SLG) as claimed in claim 5, wherein the register area is associated with at least one corresponding register area in at least one mobile data memory (MDS) for interchanging data.

7. A mobile data memory (MDS) configured for using a method for checking the quality of data transmission between at least one read/write device (SLG) and the mobile data memory (MDS), as claimed in claim 1, comprising at least one register area for entering data information relating to the quality of data transmission.

8. The mobile data memory (MDS) as claimed in claim 7, wherein the register area is associated with at least one corresponding register area in at least one read/write device (SLG) for interchanging data.

9. An identification system comprising:
   at least one mobile data memory that is fitted to an object; and
   at least one read/write device that detects at least one of object-related state data and object-related process data;
   wherein at least one of the read/write device and the mobile data memory has at least one register area for entering data information relating to the quality of data transmission between the read/write device and the mobile data memory; and
   wherein the register area is configured to be read by at least one external computer user station checking the quality of data transmission between the read/write device and the mobile data memory.

10. The identification system as claimed in claim 9, provided in at least one of a system for dispatching, transporting and manufacturing individual objects.

\* \* \* \* \*